United States Patent
Engelke et al.

(10) Patent No.: US 6,885,731 B2
(45) Date of Patent: Apr. 26, 2005

(54) CAPTIONED TELEPHONE WITH EMERGENCY ACCESS FEATURE

(76) Inventors: Robert M. Engelke, 3002 Brynwood Dr., Madison, WI (US) 53716; Kevin Colwell, 1411 Willow Trail, Middleton, WI (US) 53562; Christopher Engelke, 3002 Brynwood Dr., Madison, WI (US) 53716

( * ) Notice: Subject to any disclaimer, the term of this patent is extended or adjusted under 35 U.S.C. 154(b) by 0 days.

(21) Appl. No.: 10/628,193

(22) Filed: Jul. 28, 2003

(65) Prior Publication Data

US 2004/0076269 A1 Apr. 22, 2004

Related U.S. Application Data

(60) Provisional application No. 60/399,206, filed on Jul. 29, 2002.

(51) Int. Cl.[7] .................. H04M 11/04; H04M 11/00
(52) U.S. Cl. ................. 379/52; 379/37; 379/45; 379/40
(58) Field of Search .............. 379/37–52, 354, 379/355.01, 355.02, 355.03

(56) References Cited

U.S. PATENT DOCUMENTS

| | | | | |
|---|---|---|---|---|
| 5,701,338 A | * | 12/1997 | Leyen et al. ............... | 379/52 |
| 6,748,053 B1 | * | 6/2004 | Engelke et al. ............ | 379/52 |
| 6,763,089 B1 | * | 7/2004 | Feigenbaum .............. | 379/52 |

* cited by examiner

*Primary Examiner*—Wing F. Chan
(74) *Attorney, Agent, or Firm*—Quarles & Brady LLP

(57) ABSTRACT

Captioned telephone are devices intended to provide text captions to persons needing assistance with telephone communications. Captioned telephones provide text by using the services of a relay interposed between the assisted user and the hearing user, the relay providing the captioning for the assisted user. In normal operation, when the assisted user dials a number, the captioned telephone dials the relay which in turn dials the other party to the call. Here a method for operating a captioned telephone is disclosed where the captioned telephone monitors the number being called by the assisted user and, if the user is dialing emergency services (9-1-1 in the U.S.), the call to the relay is terminated and a direct connection to emergency services is initiated. This method is intended to provide the quickest and most error-free connection of the user to emergency services.

6 Claims, No Drawings

# CAPTIONED TELEPHONE WITH EMERGENCY ACCESS FEATURE

CROSS-REFERENCE TO RELATED APPLICATION

This application claims priority from U.S. provisional patent application Ser. No. 60/399,206 filed Jul. 29, 2002.

STATEMENT REGARDING FEDERALLY SPONSORED RESEARCH OR DEVELOPMENT

Not applicable.

BACKGROUND OF THE INVENTION

Modern telecommunication systems include facilities to permit use of telecommunication systems by those who are deaf or hard of hearing. The best known form of such communication makes use of devices known as telecommunication devices for the deaf (TDD), also known as text telephones (TTY). TTY communication is widely used between deaf people. Hearing users communicate with deaf users who are users of TDD devices through so-called "relays." A relay is a telecommunication intermediary service, funded by telephone communication surcharges, which is intended to permit deaf or hard of hearing people to utilize the normal telephone network. At a relay, an operator referred to as a call assistant intermediates between a deaf user and a hearing person by communicating with the deaf person using a TDD and communicating with the hearing person by voice over a normal telephone line.

Previous technology has enabled the relay system to be used to provide a form of enhanced telephone communication for people who are not deaf, but are hard of hearing. This approach to telecommunications is exemplified by U.S. Pat. Nos. 6,307,921 and 6,075,842, the disclosure of which is incorporated by reference. These patents, entitled "Text Enhanced Telephony," referred to a system that is now most commonly known as Captel, a service mark for the captioning service of Ultratec, Inc. and its licensees. A Captel phone, or telephone enabled to do text enhanced telephony, is capable of providing a text message to a user of the words which are transmitted to that user over a conventional telephone line. The Captel user receives normal voice from the party on the other end of the line, as well as a text transcription of the words spoken by the other party, so that the user may refer to the text for missed words in the conversation. This capability is made possible to automation in the relay which permits text to be delivered nearly simultaneously with voice. In addition, the telephone station of the assisted user is specially configured to facilitate the set up of captioned telephone calls.

BRIEF SUMMARY OF THE INVENTION

The present invention is summarized in a method of operating a captioned telephone station programmed, when a user dials a number, to normally dial a relay and transfer the called number to the relay. The present method envisions that instead of invariably first dialing the relay, the captioned telephone station monitors the number dialed by the user. The method contemplates that if the user dials the emergency service number, the captioned telephone then acts to not dial the relay but instead to dial emergency service number over the normal local telephone exchange without the intervening relay being in the call.

It is an object of the present invention to provide a captioned telephone that provides reliable emergency service for users of the system.

It is a feature of the present invention the a captioned telephone service operated in the manner described here will not require the relay to be involved in emergency calls which do not require them.

Other objects, advantages and features of the present invention will become apparent from the following specification.

BRIEF DESCRIPTION OF THE SEVERAL VIEWS OF THE DRAWINGS

Not applicable.

DETAILED DESCRIPTION OF THE INVENTION

A difficulty in the implementation of caption telephone, using a relay intermediate, is the need for the caption telephone to accurately and appropriately obtain emergency services. In most telephone systems, emergency services are most quickly summoned by calling a special emergency services number, in the U.S., know as the 9-1-1 service. Other countries use other emergency services numbers, such 9-9-9 in the United Kingdom and 0-0-0 in Australia.

Under normal operation, the caption telephone is programmed to dial a relay whenever the user wishes to place a telephone call. This is to provide the captioning services for the captioned telephone. The user dials the number of the other party, but the telephone dials the relay and passes the telephone number for the other party along to the relay so that the relay can connect to the other party. A difficulty arises from the fact that the relay need not be, and often is not, located in the geographic region of the caller. Therefore, if the user were to dial 9-1-1, the call would be normally placed to the relay, and the relay would face the responsibility of transferring that call to the emergency services system. However, the relay needs not to dial its local emergency services number, but the emergency services number of the location of the user of the system, wherever that number might be. At present, in the U.S. there is no nationwide data base system or other automated access which will provide error free transfer of telephone calls to a local 9-1-1 system. Thus the possibility arises for improper handling of a 9-1-1 calls if the captioned telephone emergency call goes to the relay service located in a remote location.

The present invention is intended to overcome this potential problem. The caption telephone is programmed so that if the emergency service number (e.g. 9-1-1) is dialed on the key pad, or automated dialer, of the caption telephone device, the caption telephone device operates differently than if any other telephone number is called. The differences are two-fold. First, the caption telephone device does not operate as a caption telephone, in that it does not invoke an intermediate relay and it does not transfer dialing data to the relay to dial by the telephone number of the other party. The caption telephone instead makes a single point-to-point call to the emergency services provider, similar to a standard voice telephone station. The second difference is that the station dials the emergency services number in a conventional manner, similarly as would occur with a standard telephone, so that the emergency services response operator is appropriately directly by the caption telephone.

In addition, it is envisioned that the caption telephone operated in its normal manner could additionally invoke a process known as voice carryover (VCO). Voice carryover is a concept from the operation of relays which permits the voice of a user and any text transmitted to a user, using TDD codes or other text communication codes, to be transferred to a common station. An example of a patent describing voice carryover, implemented in a relay, is contained in U.S. Pat. No. 5,351,288. Voice carryover mode, or "VCO" mode would permit the caption telephone device to receive both voice from the 9-1-1 station as well as text from the 9-1-1 station if someone at the emergency response station were to attempt to communicate with the user in Baudot or other text telecommunication code, such as communications in Turbo code, and enhanced communication service also from Ultratec Inc.

It is further envisioned that the caption telephone operated in this emergency response mode may generate an automatic voice message, similar to the voice message contained in some TDDs or TTYs, which tells the operator at the emergency services station that the call is being originated by a VCO capable telephone, and which further transfers other important information that might be necessary. The first Baudot ot other text communications code characters transmitted or received by either end of the communication session would terminate the automatic voice announcer so that digital text rather than voice communications are used. In the U.S., and in other countries, the emergency services system stations are all equipped for TDD communications.

In order to implement the details of this option in the caption telephone device, the following procedures have to be built into the device. Normally, for a caption telephone call, the captioned telephone to begins dial the captioning service (the relay), when the user dials the first digit of the telephone call. This feature of a conventional captioned telephone helps eliminate the call set up time through the captioning center. However, the procedure has to be different if the user is dialing emergency services. Operated normally, if the number dialed by the user were to turn out to be 9-1-1, the captioned telephone will have already dialed the captioning center or relay. Therefore, upon the detection by the caption telephone that 9-1-1 (or the other appropriate emergency services number) has been dialed, the caption telephone must first hang up on the captioning center or, in common telephone parlance, go back "on hook." Secondly, the captioned telephone must then turn the captioning mode off. Then the captioned telephone goes back "off-hook." The captioned telephone may optionally display a caption to the user, indicating what it is doing, such as the display "Captions Off, Dialing 9-1-1." The captioned telephone then dials the emergency services number directly on the normal conventional telephone system using normal telephone dialings, such as DTMF codes. Preferably, once the dialing of the emergency services operator has occurred, the station then keeps the user informed of the situation by changing the caption to read something like "Captions Off, 9-1-1 Dialed."

Once the emergency response station has replied to the telephone call, then the caption telephone is place in a "VCO" mode where the phone will receive and display digital communication characters, such as Baudot or Turbo code, as well as receiving and rendering voice communications audible to the user. The captioned telephone keyboard can also be used to send text characters to the emergency response center if appropriate. Thus both voice and text communications are fully enabled at all times to enhance the possibility of a correct communication for the emergency response.

The caption telephone can further be equipped with a voice recording announcer that starts automatically when 9-1-1 is dialed. That voice announcer might say something like "VCO caller, use text telephone" or any other appropriate phrase intended to alert the 9-1-1 call receiver that they should use their VCO procedure for this particular call. The recorded voice announcer can be place on the telephone line at a volume level that is low enough to allow the caller and the 9-1-1 operator to speak over the voice but yet still be understandable. Such a voice announcer does not disrupt the text code signaling if properly formatted. The voice announcer would further be programmed to automatically stop when the caption telephone either receives yext characters or after a prescribed amount of voice activity over the telephone line. In this way it will not interfere with further emergency telephonic communications.

This method permits a caption telephone to communicate directly to a local 9-1-1 operator without the necessity for going through an intermediate captioning center. This process increases the possibility that appropriate and correct emergency response is received by the user of the captioned telephone device. This method also cuts the time until the user is properly connected to the emergency response center to a minimum.

We claim:

1. In a method of operating a captioned telephone station programmed, when a user dials a number, to normally dial a relay and transfer the called number to the relay, the improvement comprising the steps of:

the captioned telephone station monitoring the number dialed by the user; and if the user dials number for emergency services, the captioned telephone then acts to not dial the relay but instead dial the emergency services number over the normal local telephone exchange.

2. The method of claim 1 wherein the emergency service number is 9-1-1.

3. The method of claim 1 wherein the captioned telephone when it dial the number for emergency services also turns off the captioning mode.

4. A captioned telephone device programmed to perform the method of claim 1.

5. In a method of operating a captioned telephone station programmed, when a user dials a number, to normally dial a relay and transfer the called number to the relay, the dialing of the relay commencing when the user is still dialing the number to be called, the improvement comprising the steps of:

the captioned telephone station monitoring the number dialed by the user; and if the user dials number for emergency services, the captioned telephone terminates the call to the relay and instead dials the emergency services number over the normal local telephone exchange.

6. The method of claim 5 wherein the captioned telephone also announces in voice to the emergency services number that an emergency has occurred.

* * * * *